(12) United States Patent
Ai

(10) Patent No.: US 8,651,854 B2
(45) Date of Patent: Feb. 18, 2014

(54) CONTINUOUS ROTARY INJECTION MOLDING MACHINE

(75) Inventor: Liangsheng Ai, Changsha (CN)

(73) Assignee: Hunan China Sun Pharmaceutical Machinery Co. Ltd., Changsha (CN)

( * ) Notice: Subject to any disclaimer, the term of this patent is extended or adjusted under 35 U.S.C. 154(b) by 0 days.

(21) Appl. No.: 13/497,346

(22) PCT Filed: Nov. 11, 2009

(86) PCT No.: PCT/CN2009/074903
§ 371 (c)(1),
(2), (4) Date: Mar. 21, 2012

(87) PCT Pub. No.: WO2011/035502
PCT Pub. Date: Mar. 31, 2011

(65) Prior Publication Data
US 2012/0231110 A1 Sep. 13, 2012

(30) Foreign Application Priority Data
Sep. 22, 2009 (CN) .......................... 2009 1 0176841

(51) Int. Cl.
*B29C 45/18* (2006.01)

(52) U.S. Cl.
USPC .......................................... 425/574; 425/576

(58) Field of Classification Search
USPC ......................................... 425/574, 575, 576
See application file for complete search history.

(56) References Cited

U.S. PATENT DOCUMENTS

| 3,327,352 | A | | 6/1967 | Osgood |
| 4,470,796 | A | | 9/1984 | Stroup et al. |
| 5,643,620 | A | * | 7/1997 | Brun, Jr. .................. 425/556 |
| 6,126,433 | A | * | 10/2000 | Svoboda ................... 425/557 |
| 6,179,605 | B1 | | 1/2001 | Littleton et al. |
| 2003/0227108 | A1 | | 12/2003 | Okerson |

FOREIGN PATENT DOCUMENTS

| CN | 2908121 Y | 6/2007 |
| CN | 101456239 A | 6/2009 |
| DE | 21 50 839 | 4/1972 |
| DE | 41 38 849 | 5/1993 |

OTHER PUBLICATIONS

International Search Report dated Jun. 24, 2010 for PCT/CN2009/074903.

\* cited by examiner

*Primary Examiner* — Tim Heitbrink
(74) *Attorney, Agent, or Firm* — Morgan, Lewis & Bockius LLP

(57) ABSTRACT

A continuous rotary injection molding machine, comprising a continuous extrusion-type injection system having an injection nozzle arranged downwards; a plurality of first injection runners, arranged horizontally, the injection nozzle of the injection system is located at a junction of the plurality of first injection runners; heating members, arranged around the plurality of first injection runners; plural groups of molding molds, arranged under the first injection runners; a plurality of second injection runners, arranged between the first injection runners and the mold cavities; and a plurality of injection switches, arranged on either the first injection runners or the second injection runners.

7 Claims, 3 Drawing Sheets

CONTINUOUS ROTARY INJECTION MOLDING MACHINE

The present application is the national stage application of PCT/CN2009/074903, filed Nov. 11, 2009, which claims priority to Chinese Patent Application No. 200910176841.7, filed Sep. 9, 2009, the contents of both are incorporated herein by reference.

TECHNICAL FIELD OF THE INVENTION

The invention relates to a continuous rotary injection molding machine.

BACKGROUND OF THE INVENTION

The existing injection molding machine generally produces a workpiece in a way of intermittent injection. When the size of the workpiece is small and a batch of workpieces are in large quantity, the production is generally performed by means of a multi-cavity mold (one mode has plural cavities), in order to improve the production efficiency. In this way, the injection molding machine is in the state of intermittent production in a large injection volume.

The inventor finds that the prior art at least has the following problems: as the existing injection molding machine employs a multi-cavity mold, during the production, the injection molding machine is in the state of the intermittent production in a large injection volume, so that too much resources are occupied and too much energy is consumed.

SUMMARY OF THE INVENTION

The purpose of the disclosure is to provide a continuous rotary injection molding machine, which can solve the problems that too much resources are occupied and too much energy is consumed due to the fact that the injection molding machine is in the state of intermittent production in large injection volume during the production since the existing injection molding machine employs a multi-cavity mold.

In the embodiment of the disclosure, a continuous rotary injection molding machine is provided, comprising: a continuous extrusion-type injection system, having an injection nozzle arranged downwards; a plurality of first injection runners, arranged horizontally, wherein the injection nozzle of the continuous extrusion-type injection system is located at the junction of the plurality of first injection runners; heating members, arranged around the plurality of first injection runners; plural groups of molding molds, arranged under the first injection runners; a plurality of second injection runners, arranged between the first injection runners and a mold cavities; a plurality of injection switches, arranged on a runner consisting of the first injection runners and the second injection runner.

Preferably, the continuous extrusion-type injection system is arranged vertically.

Preferably, the continuous extrusion-type injection system is arranged horizontally.

Preferably, the plural groups of molding molds are distributed circumferentially.

Preferably, each of the plural groups of molding molds comprises: a mold cavity, a first movable block, a second movable block and a mold core.

Preferably, the injection switches are arranged on the first injection runners.

Preferably, the injection switches are arranged on the second injection runners.

With the continuous rotary injection molding machine of the disclosure which allows the production of continuously injecting the small capacity cavities one by one, an injection screw with small injection volume is required for use. In the case of achieving the same injection volume, the energy consumed in the disclosure is only about 70% of that consumed in the prior art. Therefore the present disclosure overcomes problems that too much resources are occupied and too much energy is consumed because the injection molding machine is in the state of intermittent production of large injection volume during the production since the existing injection molding machine employs a multi-cavity mold, and further the cost is reduced.

BRIEF DESCRIPTION OF THE DRAWINGS

The drawings form a part of the description and are provided for further understanding of the disclosure. The exemplary embodiments of the disclosure and the description thereof are used for explaining the present disclosure and are not intend to limit the present disclosure. In the drawings.

DETAILED DESCRIPTION OF THE INVENTION

The disclosure will be described in detail below with reference to drawings and embodiments.

Figure 1:
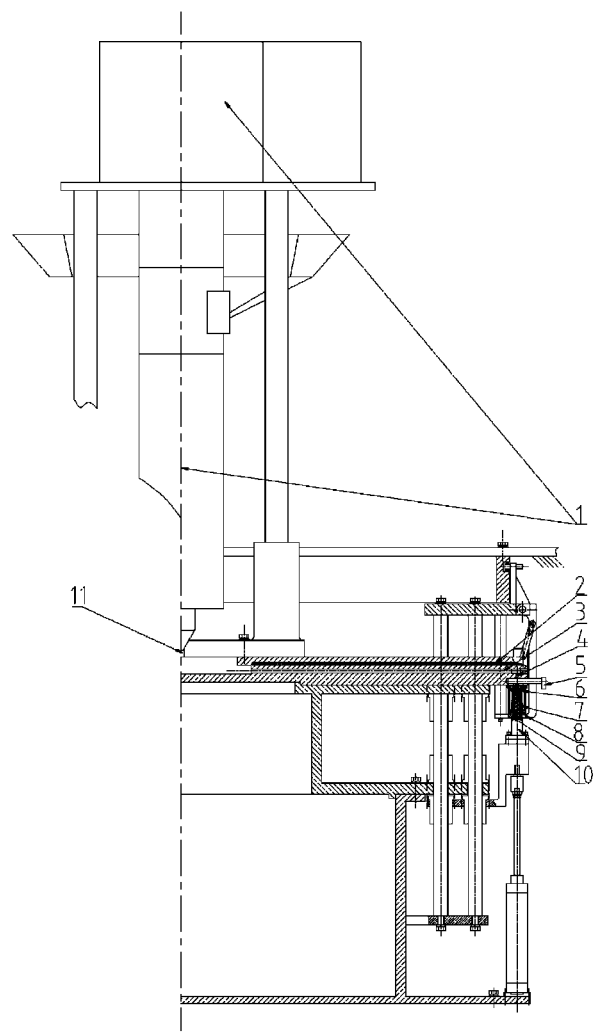
FIG. 1 schematically shows the structure according to one embodiment of the disclosure.
Figure 2:
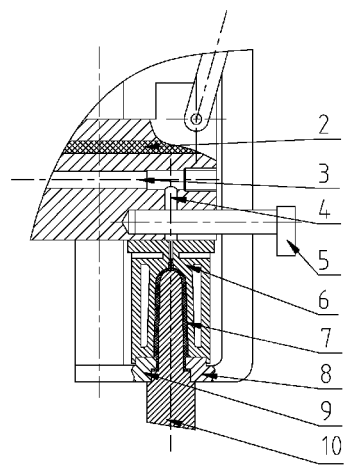
FIG. 2 schematically shows the structure when the injection is executed by using the continuous extrusion-type injection system according to the disclosure (the mold is closed completely)
Figure 3:
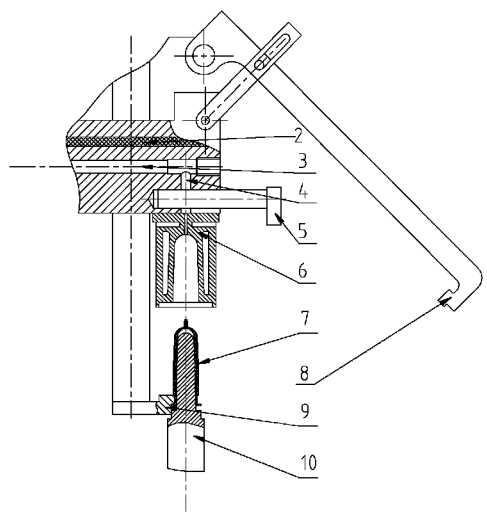
FIG. 3 schematically shows the structure when the mold is not opened completely after the injection is finished by using the continuous extrusion-type injection system according to the disclosure.
Figure 4:
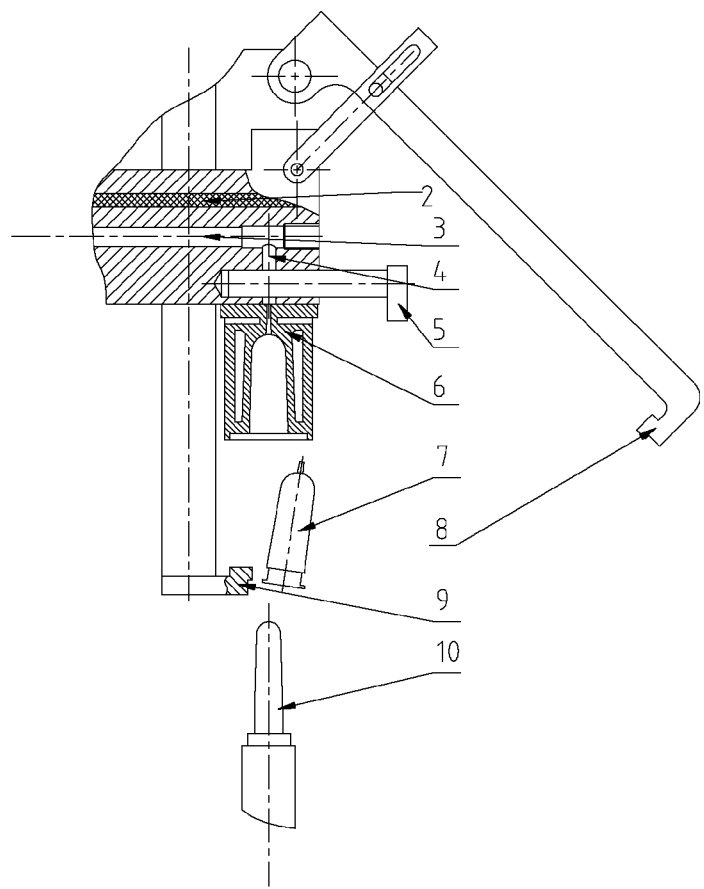
FIG. 4 schematically shows the structure when the mold is opened completely after the injection is finished by using the continuous extrusion-type injection system according to the disclosure.

FIG. 1 exemplarily shows the structure according to one embodiment of the disclosure. With reference to FIG. 2 to FIG. 4, as shown in the drawings, in the embodiment of the disclosure, a continuous rotary injection molding machine is provided, comprising a continuous extrusion-type injection system 1, having an injection nozzle 11 arranged downwards; a plurality of first injection runners 3, arranged horizontally, wherein the injection nozzle 11 of the continuous extrusion-type injection system 1 is located at the junction between the plurality of first injection runners 3; heating members 2, arranged around the plurality of first injection runners 3; plural groups of molding molds 6, 8, 9, and 10, arranged under the first injection runners 3; a plurality of second injection runners 4, arranged between the first injection runners 3 and a mold cavity; a plurality of injection switches 5, arranged on a runner consisting of the first injection runners 3 and the second injection runners 4.

Preferably, each of the plural groups of molding molds 6, 8, 9 and 10 comprise: a mold cavity, a first movable block 8, a second movable block 9 and a mold core 10.

Preferably, the plural groups of molding molds 6, 8, 9 and 10 are distributed circumferentially. In this way, the continuous extrusion-type injection system 1 injects one by one plastic into the plural groups of molding molds 6, 8, 9 and 10 which are circumferentially distributed and consist of the mold cavity, the first movable block 8, the second movable block 9 and the mold core 10. The manufacture process of a single plastic product 7 comprises four stages: mold closing, injection, cooling and mold opening, and the four stages are finished during continuous rotation. The first injection runners 3 for plastic are hot runners provided with heating members 2, so that the plastic can be kept at a proper temperature in the first injection runners 3. One of the injection switches 5 is arranged in a first injection runner 3 or a second injection runner 4, and it is possible to inject or stop injecting the product molding molds 6, 8, 9 and 10 according to the production demands.

As shown in FIG. 1, FIG. 2, FIG. 3 and FIG. 4, the injection nozzle 11 of the continuous extrusion-type injection system 1 in the continuous rotary injection molding machine is arranged downwards. The plurality of first injection runners 3 in a radial shape are arranged horizontally and the injection nozzle 11 of the injection system is located at the junction of the first injection runners 3. Heating members 2 are arranged near the first injection runners 3. The product molding mold comprising the mold cavity, the first movable block 8, the second movable block 9 and the mold core 10 is correspondingly arranged under the outer end of each first injection runner 3. The second injection runner 4 is arranged between the first injection runners 3 and the mold cavity, and the injection switch 5 is arranged in the first injection runner 3 or the second injection runner 4. The continuous extrusion-type injection system 1 and the first injection runners 3 rotate synchronously along with the product molding molds and other components. During the operation of the injection molding machine, the mold core 10 ascends, and the first movable block 8 and the second movable block 9 also ascend. During the ascending procedure, the first movable block 8 and the second movable block 9 are folded together, and the injection switch 5 is switched on (closed) when the mold core 10, the first movable block 8, the second movable block 9 and the mold cavity form a closed mold cavity. The continuous extrusion-type injection system 1 injects molten plastic into the closed mold cavity formed by the mold core 10, the first movable block 8, the second movable block 9 and the mold cavity, through the injection nozzle 11, the first injection runners 3 and the second injection runner 4. After a set time period of pressure reservation and temperature reduction, the injection switch 5 is switched off, and the mold core 10, the first movable block 8 and the second movable block 9 descend at different speeds. During the descending procedure, the first movable block 8 opens, the plastic product 7 is discharged from the injection molding machine by an external force when the mold core 10 is completely disengaged from the plastic product 7. Then the first movable block 8, the second movable block 9 and the mold core 10 ascend again for the next production.

Preferably, the continuous extrusion-type injection system 1 is arranged vertically. In this way, plastic may be injected well at the junction of the first injection runners 3. Certainly, the continuous extrusion-type injection system 1 may also be arranged horizontally, and the height of the machine may be decreased in aid of auxiliary components when the injection system is arranged horizontally.

From the above description, it may be seen that the embodiments of the disclosure realize the following technical effects:

with the continuous rotary injection molding machine of the disclosure which allows the production of continuously injecting the small capacity cavities one by one, the injection screw with small injection volume is required for use. In the case of achieving the same injection volume, the energy consumed in the present disclosure is only about 70% of that consumed in the prior art. Therefore the disclosure overcomes the problems that too much resources are occupied and too much energy is consumed because the injection molding machine is in the state of intermittent production of large injection volume during production as the existing injection molding machine employs a multi-cavity mold, and further the cost is reduced.

The above description is only for the preferred embodiments of the present invention and not used for limiting the invention. For one skilled in the art, the present invention may have various modifications and changes. Any modifications, equivalent replacements and improvements made within the spirit and principle of the present invention should be contained within the protection scope of the present invention.

The invention claimed is:

1. A continuous rotary injection molding machine, comprising:
   a continuous extrusion injection system, having an injection nozzle arranged downwards;
   a plurality of first injection runners, arranged horizontally, wherein the injection nozzle of the continuous extrusion injection system is located at a junction of the plurality of first injection runners;
   heating members, arranged around the plurality of first injection runners;
   plural groups of molding molds, each arranged under a respective one of the first injection runners and having a respective mold cavity;
   a plurality of second injection runners, each arranged between a respective one of the first injection runners and a corresponding one of the mold cavities; and
   a plurality of injection switches, each arranged on a respective runner consisting of a respective one of the first injection runners and a corresponding one of the second injection runners; wherein
   the continuous extrusion injection system and the first injection runners are configured to rotate synchronously along with the plural groups of molding molds such that the manufacture process of a single product is finished during a continuous rotation.

2. The continuous rotary injection molding machine according to claim 1, wherein the continuous extrusion injection system is arranged vertically.

3. The continuous rotary injection molding machine according to claim 1, wherein the continuous extrusion injection system is arranged horizontally.

4. The continuous rotary injection molding machine according to claim 1, wherein the plural groups of molding molds are distributed circumferentially.

5. The continuous rotary injection molding machine according to claim 1, wherein each of the plural groups of molding molds comprises: a mold cavity, a first movable block, a second movable block and a mold core.

6. The continuous rotary injection molding machine according to claim 1, wherein the injection switches are arranged in the first injection runners.

7. The continuous rotary injection molding machine according to claim 1, wherein the injection switches are arranged in the second injection runners.

* * * * *